United States Patent Office 3,466,140
Patented Sept. 9, 1969

3,466,140
PROCESS FOR PRODUCING REDUCED
TRANSITION METAL HALIDES
Geoffrey H. Smith, Stow, and William M. Saltman, Akron, Ohio, assignors to The Goodyear Tire & Rubber Company, Akron, Ohio, a corporation of Ohio
No Drawing. Filed Mar. 31, 1967, Ser. No. 627,328
Int. Cl. C01g 1/06; B01j 11/06
U.S. Cl. 23—87
10 Claims

ABSTRACT OF THE DISCLOSURE

A method of preparing a catalytically active form of β titanium trichloride by reacting a compound prepared from aluminum, aluminum chloride, titanium tetrachloride and an aromatic hydrocarbon (arene) and having the empirical formula, arene·$TiAl_2Cl_8$, with additional titanium tetrachloride in excess arene solvent, in the presence of a ligand which will complex aluminum chloride, whereby the β titanium trichloride is precipitated essentially free of aluminum chloride. The so produced β titanium trichloride has been found useful in the polymerization of diolefins to form polymers containing a high percentage of 1,4 configuration, and has been found particularly useful in the polymerization of isoprene to substantially all cis 1,4-polyisoprene.

---

This invention relates to a method of preparing a catalytically active form of beta titanium trichloride. More specifically it relates to a method to prepare β titanium trichloride suitable for use as a polymerization co-catalyst along with an organometallic compound to polymerize diolefins to polymers having a high degree of stereoregularity. Yet more specifically, it relates to a method of preparing β titanium trichloride suitable for use as a polymerization co-catalyst along with an organoaluminum compound to polymerize isoprene to a high cis 1,4 polyisoprene.

Methods for the preparation of β titanium trichloride (β $TiCl_3$) from higher valence state titanium halides such as titanium tetrachloride ($TiCl_4$) are known. For instance, β titanium trichloride can be produced by reacting titanium tetrachloride with a complex prepared from the reaction of aluminum powder (Al), aluminum chloride ($AlCl_3$), titanium tetrachloride and an arene such as benzene. However, such β titanium trichloride when employed as a catalyst to polymerize conjugated diolefins possesses poor stereospecific polymerization activity. The β titanium trichloride prepared in this manner contains aluminum chloride, which causes a cationic polymerization, resulting in non-stereoregular polymers. This cationic behavior of this particular β titanium trichloride containing aluminum chloride may be supressed but only by the use of excessive amounts of additional organometallic compounds, for instance, aluminum trialkyls.

Another method known to the art for producing β titanium trichloride consists of reacting mixtures of titanium tetrachloride and aluminum alkyl compounds, for example, an aluminum trialkyl such as aluminum triisobutyl. This form of β titanium trichloride is satisfactory for the polymerization of conjugated diolefins such as isoprene to form high cis 1,4 polyisoprene. This method does, however, require the use of substantial amounts of expensive and potentially dangerous aluminum trialkyl.

Therefore, it is an object of this invention to produce a catalytically active form of β titanium trichloride. It is a further object to produce a catalytically active form of β titanium trichloride without the use of aluminum trialkyls. It is another object to provide a method of preparing β titanium trichloride which is essentially free of aluminum chloride. Other objects will appear as this description proceeds.

According to the invention, it has been unexpectedly discovered that an active form of beta titanium trichloride can be prepared by reacting titanium tetrachloride with a compound formed by the reaction of aluminum, aluminum chloride, titanium tetrachloride and an arene when the reaction is conducted in the presence of a ligand which can complex with aluminum chloride.

It is an advantage of this invention that the ligand employed forms a complex with aluminum chloride which complex remains soluble in the arene solvent in which the reaction is conducted. At the same time the active β titanium trichloride is precipitated in essentially an aluminum-free form.

It is known that a reaction of a mixture of aluminum, aluminum chloride, titanium tetrachloride and an arene, employing a fairly wide range of molar ratios of the reactants, produces a crystalline solid which is believed to correspond to the empirical formula:

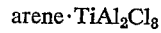
arene·$TiAl_2Cl_8$

This reaction, using benzene ($C_6H_6$) as the arene is believed to be:

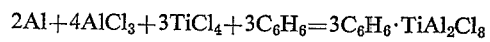
$$2Al + 4AlCl_3 + 3TiCl_4 + 3C_6H_6 = 3C_6H_6 \cdot TiAl_2Cl_8$$

It is also known that the further reaction of this product with additional titanium tetrachloride results in the formation of a brown solid containing β titanium trichloride. However, it appears that this brown solid is β titanium trichloride complexed with or co-crystallized with aluminum chloride. In some manner the β $TiCl_3$ and $AlCl_3$ are bound together, so that the two salts cannot be separated. This second reaction of the compound of aluminum, aluminum chloride, titanium tetrachloride and an arene with additional titanium tetrachloride is believed to be (again using benzene as the arene):

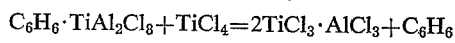
$$C_6H_6 \cdot TiAl_2Cl_8 + TiCl_4 = 2TiCl_3 \cdot AlCl_3 + C_6H_6$$

It has been found that neither of these compounds, arene·$TiAl_2Cl_8$ nor $TiCl_3 \cdot AlCl_3$ is suitable as catalysts to polymerize diolefins to polymers which contain any substantial amount of cis 1,4 structure.

The present invention is directed to a method which does produce a material which when employed as a catalyst to polymerize diolefins, results in a polymer containing substantial amounts of 1,4 content. The present invention results in the formation of an active form of β titanium trichloride which is substantially free from any complexed, co-crystallized or bound materials such as aluminum chloride.

It is believed that the present invention may be symbolically described as the insoluble product from the reaction:

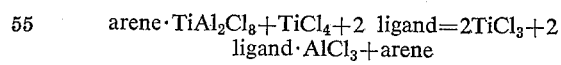
$$arene \cdot TiAl_2Cl_8 + TiCl_4 + 2 \text{ ligand} = 2TiCl_3 + 2 \text{ ligand} \cdot AlCl_3 + arene$$

It would appear, thus, that when arene·$TiAl_2Cl_8$ is reacted with $TiCl_4$ in the presence of a sufficient amount of ligand, a ligand·$AlCl_3$ complex is formed which is soluble in the arene solvent, while the β $TiCl_3$, essentially pure, forms an insoluble precipitate. This phenomenon then leads to an easy method to separate the β $TiCl_3$ substantially free from other deleterious materials. Thus, not only does this invention provide a method for preparing a catalytically active form of β titanium trichloride, it also provides an easy method for separation and purification of the β $TiCl_3$.

In addition to an active form of β titanium trichloride an active form of titanium tribromide and titanium triiodide can be prepared by the technique of this invention. An active form of titanium tribromide can be prepared by reacting titanium tetrabromide with a compound formed by the reaction of aluminum, aluminum tribromide, titanium tetrabromide and an arene, in the presence of a ligand which will complex aluminum tribromide. An active form of titanium triiodide can be prepared by reacting titanium tetraiodide with a compound formed by the reaction of aluminum, aluminum triiodide, titanium tetraiodide and an arene, in the presence of a ligand which will complex aluminum triiodide. However, there are certain problems attendant to these processes. For instance, titanium tetraiodide is a solid which is essentially insoluble in any of the arenes which are used as the arene and the solvent in such a reaction. Thus, titanium tetraiodide would have to be prepared in an extremely fine suspension to cause the reaction to take place. Another disadvantage is that both aluminum tribromide and aluminum triiodide are rather expensive chemicals, whereas, aluminum chloride is relatively inexpensive.

In the formation of the arene·$TiAl_2Cl_8$ which is subsequently reacted in the presence of a ligand with additional titanium tetrachloride, the ratio of the reactants to each other may be varied over a wide range. It is preferable to use an excess of the aluminum metal, usually in powder form, and somewhat lesser excess of aluminum chloride relative to the titanium tetrachloride used. The arene, likewise, is used in excess as it also acts as a solvent for the reacting constituents. Good yields of the arene·$TiAl_2Cl_8$ have been obtained when the mole ratio of $TiCl_4/AlCl_3/Al$ range from about 1/1.3/1 to about 1/20/50, with a preferable ratio ranging between about 1/2/2 and about 1/6/20. It has been found that good results are obtained at a ratio of about 1/2/6.

The preparation of the arene·$TiAl_2Cl_8$ may be carried out over a wide range of temperatures. A convenient method of preparing the complex is to carry it out under reflux conditions at the boiling temperature of the arene, i.e., about 75° C. However, when temperatures below the reflux temperature are used, e.g., 50° C., an inert gas should be employed to blanket the reactants. When using benezene as both the complexing arene and the reaction solvent, a temperature about 75° C. to 80° C. has been found satisfactory. By such a technique the complex is formed in good yield in about 1 to 8 hours, depending upon the particular reaction conditions.

Representative of suitable arenes which may also be employed as solvents in the formation of the complex are selected from a class of benzene, alkylated benzenes, such as toluene, xylenes, mesitylene, ethyl benzene; halogenated benzenes as chlorobenzene; also naphthalene, Tetralin, cumene and cyclohexylbenzene may be employed. It is usually preferable to use benzene as both the arene involved in the reaction and as a solvent.

The ligands which are employed in this invention are ligands which, under the reaction conditions employed, will complex with aluminum chloride to form a soluble complex in the arene solvent used as a medium in which the reaction is conducted. Representative of such ligands are ethers, examples of which are aliphatic ethers represented by diethyl, ethyl methyl, dipropyl ethers; diaryl ethers represented by diphenyl, ditolyl, dixylyl, phenyltolyl, dibiphenyl, mixed aliphatic-aromatic ethers such as methylphenyl (anisole), ethylphenyl and the like; thioethers represented by phenylmethyl, diphenyl sulfides, and the like; amides represented by dimethylformamide, acetamide, dimethyl acetamide, propionamide; ketones represented by benzophenone, acetophenone, butyrone and the like; phenol and alkylated phenols represented by p-cresol, o-ethylphenyl and other alkylated phenols; sulfur compounds, examples of which are diphenylsulfate, diethylsulfate, dimethylsulfoxide, diethylsulfoxide, dibutysulfoxide, dioctylsulfone, dimethylbenzene sulfonamide, dimethylsulfone and the like; carboxylic esters, representative of which are propyl adipate, ethyl benzoate, ethyl malonate, butyl succinate, butyl naphthoate and the like; organic phosphorous compounds, examples of which are hexaoctyl phosphoric triamide, triethyl phosphate, tricresyl phosphate, triphenyl phosphite, triethylphosphite and the like.

The preferred ligands which are employed in the process of this invention are ethers. These ethers are compounds corresponding to the formula ROR' wherein R and R' are selected from the group consisting of alkyl, cycloalkyl, aryl, alkaryl and aralkyl. Representative examples of such ethers are dimethyl ether, diethyl ether, diisopropyl ether, dibutyl ether, diphenyl ether, phenetole, benzyl ethyl ether, anisole, methyl ethyl ether, ethyl cyclohexyl ether, benzyl ether and tolyl ether. However any ligand which will remove aluminum chloride and does not destroy the other reagents can be employed.

It is usually not necessary to separate or crystallize the complex arene·$TiAl_2Cl_8$ from the arene solvent before proceeding to the preparation of the β titanium trichloride. Usually at the end of the complex formation reaction, the agitation is stopped and the unreacted excess aluminum and $AlCl_3$ settle out. The arene solution of the complex can then be decanted off.

In the formation of the β titanium trichloride the reaction between arene·$TiAl_2Cl_8$ and titanium tetrachloride can take place either in a one-step or a two-step reaction. If a one-step reaction is desired the proper ratios of titanium tetrachloride and the ligand are simultaneously added to the solution of arene·$TiAl_2Cl_8$ at which time the β titanium trichloride precipitates, thus facilitating its removal from the other reaction products. An alternate one-step process is to add the arene·$TiAl_2Cl_8$ to a mixture of the ligand and $TiCl_4$ in the arene, again precipitating the active form of β $TiCl_3$. If a two-step process is desired, the ligand is added to the arene·$TiAl_2Cl_8$ complex in arene solution first and subsequently the titanium tetrachloride is added, or $TiCl_4$ is dissolved in the arene followed by the complex, followed by the ligand. In other words, no specific order of addition is required so long as all the reactants are present. The β titanium trichloride precipitates and may be readily separated from the other reaction products and the solvent.

While the exact mechanism of the preparation of β $TiCl_3$ by the method of this invention is not known, it is known that at least two moles of the complexing ligand are theoretically required per mole of arene·$TiAl_2Cl_8$ complex to completely remove the aluminum chloride when the complex decomposes during the reaction with additional $TiCl_4$. This is not to say, however, that less than 2 moles of ligand per mole of complex cannot be employed but that when less than 2 moles of ligand per mole of complex are employed, all of the $AlCl_3$ may not be removed. Thus, the mole ratio of ligand to complex may vary quite broadly, but it is preferred to use at least a 4/1 mole ratio of ligand to complex to insure complete separation of aluminum compounds from the precipitated β $TiCl_3$.

While there is no limit to the amount of additional titanium tetrachloride added to precipitate β titanium trichloride, it is economical to add only enough to recover a major amount of β $TiCl_3$. Since titanium tetrachloride is a liquid, and is soluble in hydrocarbon solvents such as benzene, pentane and the like, any excess which is included to precipitate the β titanium trichloride may be readily washed out. However, on the other hand, a large excess of titanium tetrachloride relative to the complex would be uneconomical. Therefore, theoretically the optimum should be one mole of titanium tetrachloride per mole of the complex arene·$TiAl_2Cl_8$. It has been found as a practical matter that it is preferable to use a small excess of $TiCl_4$, e.g., a mole ratio of about 1.1/1 to about 1.5/1, $TiCl_4$/arene·$TiAl_2Cl_8$ complex followed by a thorough washing of the β $TiCl_3$ to remove traces of excess $TiCl_4$.

In the preparation of β TiCl₃ of this invention, it is usually desirable to employ air- and moisture-free techniques, as both the β titanium trichloride and the starting materials TiCl₄ and arene·TiAl₂Cl₈, are susceptible to degradation by both air and moisture.

The temperature at which the final step of the preparation of the β TiCl₃ is carried out is not critical and may vary over a relatively wide range. It is known, however, that at temperatures above about 80° C. the product β TiCl₃, begins to transform to a different, structural active form; thus, for best results, an upper limit of about 80° C. should not be exceeded unless it is desired to prepare the other (gamma) form of TiCl₃. On the other hand, it has been discovered that the lower the temperature at which the formation of β TiCl₃ is prepared, the more catalytically active it appears to be. It would appear, then, that the lower practicable limit at which the reaction may be carried out is controlled by the freezing point of the particularly arene solvent employed. It has been observed that when the preferred ligands, diphenyl ether or anisole, and the preferred arene, benzene, are employed, about 10° C. is a very effective temperature at which to operate.

As has been mentioned previously, the β titanium trichloride need not be washed, but it has been found by experience that it is usually desirable to wash it to remove any traces of residual aluminum chloride and titanium tetrachloride which may be present. This washing may be accomplished by either filtration or centrifuging using conventional techniques and conventional solvents such as benzene, pentene, hexene and the like.

The invention is further illustrated by reference to the following examples, in which all parts are by weight unless otherwise indicated. These examples are intended to be representative rather than restrictive of the scope of this invention.

EXAMPLE I

Preparation of C₆H₆·TiAl₂Cl₈ complex

A 50 milliliter 3-necked flask was loaded, in a dry box, with 16 grams of anhydrous aluminum chloride (AlCl₃) and 10.2 grams of dried aluminum dust. A small Teflon coated magnetic stirrer bar was placed in the flask, the flask was placed on a magnetic stirrer and connected to a reflux condenser, a nitrogen inlet and a nitrogen outlet filtration apparatus. Pure nitrogen was swept through the flask and 100 milliliters of benezene (C₆H₆) was added, the stirrer turned on and 11.5 grams of titanium tetrachloride (TiCl₄) was added. The flask was heated by an oil bath to 120° C. At the end of 20 hours the deep violet solution was cooled to and filtered at 20° C. Then 100 milliliters of heptane was added to the filtrate and the mixture cooled to −10° C. and most of the solid purple precipitate crystallized out. The majority of the mixed solvent was removed by a syringe and the remainder in vacuo at 25° C. A total yield of 81% (based on the TiCl₄ charged) was obtained as fine, deep violet crystals. The entire procedure was carried out with the careful exclusion of air and moisture.

EXAMPLE II

Preparation of β titanium trichloride

To a suitable flask was added 54 grams of benzene and 3.3 grams of the C₆H₆·TiAl₂Cl₈ complex prepared in Example I. To this mixture 3.0 milliliters of anisole was added. Immediately a dark-brown precipitate formed. No evolution of heat was noted. Then 24 milliliters of a 0.3 molar solution of titanium tetrachloride in benzene was added. A very dark-brown precipitate formed and the mixture was allowed to stand for 30 minutes. This mixture was then centrifuged and a dark-brown solid and a brown-benzene layer were separated. The benzene layer was removed and the brown solid was washed four times with fresh benzene. The benzene from the washings and from the original layer was hydrolyzed with aqueous sulfuric acid and extracted exhaustedly with the hydrolysis agent. An aluminum analysis of the aqueous extract indicated that 0.41 gram of aluminum had been removed from the reaction mixture. Based on the amount of ingredients employed, the theoretical results accounting for all of the aluminum added should have been 0.40 gram. The amounts of C₆H₆·TiAl₂Cl₈ complex, ether (anisole) and TiCl₄ employed in this example, when calculated on a molar relationship to each other, were an ether/arene·TiAl₂Cl₈ mole ratio of 3.86/1 and the TiCl₄/arene·TiCl₂Cl₈ mole ratio of 1.1/1.

EXAMPLE III

As indicated previously, there seems to be a stoichiometric relationship between the amount of ligand used and the proporation of aluminum chloride removed during the reaction between titanium tetrachloride and the complex C₆H₆·TiAl₂Cl₈ in the preparation of β titanium trichloride.

A controlled mole ratio of diphenyl ether, and the complex was maintained in this example which is otherwise identical to Example II. After separation of the precipitated β titanium trichloride, the benzene solution was analyzed for the aluminum resulting from the complex of the aluminum chloride and the diphenyl ether ligand. The results are given in the table below wherein column 1 is the mole ratio of diphenyl ether to the complex

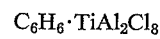

column 2 is the percent of aluminum which could be theoretically removed by the diphenyl ether; column 3 is the actual percent of aluminum chloride removed.

| Mole ratio | Theoretical percent | Actual percent |
|---|---|---|
| 1/1 | 50 | 50 |
| 2/1 | 100 | 91 |

A washing step is required to remove the last traces of Al⁺⁺⁺ from the precipitated β titanium trichloride. However, polymerization tests indicate that when the 2/1 mole ratio is employed, the remaining residue of aluminum (9%) did not impair the efficiency of the β titanium trichloride as a sterospecific polymerization catalyst. Further tests on the β titanium trichloride prepared in the second experiment of this example indicate that the 9% residual aluminum was somehow "occluded" on the β TiCl₃.

As previously illustrated in Example II an excess of the ligand to complex should be used. All of the aluminum chloride is then removed from the precipitated β TiCl₃ without extensive washings.

While certain representative embodiments and details have been shown for the purpose of illustrating the invention it will be apparent to those skilled in this art that various changes and modifications may be made therein without departing from the spirit or scope of the invention.

What is claimed is:

1. A method of preparing β titanium trichloride which comprises reacting under substantially moisture and air-free conditions, titanium tetrachloride with a compound formed by the reaction of aluminum, aluminum chloride, titanium tetrachloride and an aromatic hydrocarbon at a temperature which does not exceed 80° C., in the pressure of a ligand which will form an aromatic hydrocarbon soluble complex with aluminum chloride, and recovering the so prepared β titanium trichloride.

2. The method according to claim 1 in which the compound prepared from aluminum, alumiuum chloride, titanium tetrachloride and an aromatic hydrocarbon is prepared employing a mole ratio of TiCl₄/AlCl₃/Al ranging from about 1/1.3/1 to about 1/20/50.

3. The method according to claim 1 in which the mole ratio of titanium tetrachloride/the compound formed by the reaction of aluminum, aluminum chloride, titanium tetrachloride and an aromatic hydrocarbon ranges from about 1.1/1 to about 1.5/1.

4. The method according to claim 12 in which the mole ratio of titanium tetrachloride/the compound formed by the reaction of aluminum, aluminum chloride, titanium tetrachloride and an aromatic hydrocarbon ranges from about 1.1/1 to about 1.5/1 and in which the compound prepared from aluminum, aluminum chloride, titanium tetrachloride and an aromatic hydrocarbon is prepared employing a mole ratio of $TiCl_4/AlCl_3/Al$ ranging from about 1/1.3/1 to about 1/20/50.

5. The method according to claim 1 in which the ligand employed is an ether.

6. The method according to claim 1 in which the aromatic hydrocarbon employed is benzene.

7. The method according to claim 1 in which the mole ratio of ligand to the compound prepared by the reaction of aluminum, aluminum chloride, titanium tetrachloride and an aromatic hydrocarbon is at least 2/1.

8. The method according to claim 5 in which the ether is selected from the group consisting of diphenyl ether, methyl phenyl ether and diethyl ether.

9. The method according to claim 8 in which the ether is methyl phenyl ether.

10. The method according to claim 4 in which the mole ratio of ligand to the compound prepared by the reaction of aluminum, aluminum chloride, titanium tetrachloride and an aromatic hydrocarbon is at least 2/1.

References Cited
UNITED STATES PATENTS

| | | | |
|---|---|---|---|
| 3,017,401 | 1/1962 | Bo et al. | 23—87 XR |
| 3,032,513 | 5/1962 | Tornqvist et al. | 23—87 XR |
| 3,109,822 | 11/1963 | Kaufman et al. | 23—87 XR |
| 3,128,252 | 4/1964 | Tornqvist et al. | 23—87 XR |
| 3,135,702 | 6/1964 | De Vries et al. | 23—87 XR |
| 3,146,224 | 8/1964 | Coover et al. | 23—87 XR |
| 3,278,258 | 10/1966 | Tornqvist et al. | 23—87 |
| 3,345,351 | 10/1967 | McCall et al. | 23—87 XR |
| 3,404,141 | 10/1968 | Owen | 260—94.3 |

OTHER REFERENCES

Journal of Polymer Science, vol. 51, pp. 399–403 (1961).

EDWARD STERN, Primary Examiner

U.S. Cl. X.R.

252—429, 442; 260—93.7

PO-1050
(5/69)

UNITED STATES PATENT OFFICE
CERTIFICATE OF CORRECTION

Patent No. 3,466,140          Dated September 9, 1969

Inventor(s) Geoffrey H. Smith and William M. Saltman

It is certified that error appears in the above-identified patent and that said Letters Patent are hereby corrected as shown below:

Column 5, line 40, (Example I), "50" should read --500--;

Column 6, line 65, (Claim 1), "pressure" should read --presence--;

SIGNED AND
SEALED
MAR 10 1970

(SEAL)
Attest:

Edward M. Fletcher, Jr.
Attesting Officer

WILLIAM E. SCHUYLER, JR.
Commissioner of Patents